United States Patent
Yamaoka et al.

(10) Patent No.: US 12,092,130 B2
(45) Date of Patent: Sep. 17, 2024

(54) BLOWER

(71) Applicant: Nanjing Chervon Industry Co., Ltd., Nanjing (CN)

(72) Inventors: Toshinari Yamaoka, Nanjing (CN); Jingwei Li, Nanjing (CN); Jianpeng Guo, Nanjing (CN); Zhusheng Nie, Nanjing (CN); Jian Zhang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 79 days.

(21) Appl. No.: 18/097,045

(22) Filed: Jan. 13, 2023

(65) Prior Publication Data

US 2023/0220851 A1 Jul. 13, 2023

Related U.S. Application Data

(63) Continuation of application No. PCT/CN2021/110188, filed on Aug. 3, 2021.

(30) Foreign Application Priority Data

| Aug. 3, 2020 | (CN) | 202010764709.4 |
| Jul. 23, 2021 | (CN) | 202110836473.5 |
| Jul. 23, 2021 | (CN) | 202110836478.8 |

(51) Int. Cl.
*F04D 29/52* (2006.01)
*A01G 20/47* (2018.01)
(Continued)

(52) U.S. Cl.
CPC .......... *F04D 29/522* (2013.01); *A01G 20/47* (2018.02); *F04D 25/0673* (2013.01); *F04D 29/545* (2013.01)

(58) Field of Classification Search
CPC .... F04D 19/002; F04D 29/328; F04D 29/329; F04D 29/522; F04D 29/545; F04D 29/547; A01G 20/47
See application file for complete search history.

(56) References Cited

U.S. PATENT DOCUMENTS

| 6,199,295 B1 | 3/2001 | Smal |
| 2020/0096006 A1* | 3/2020 | Shao ..................... F04D 25/084 |

(Continued)

FOREIGN PATENT DOCUMENTS

| CN | 107259762 A | 10/2017 |
| CN | 108175169 A | 6/2018 |

(Continued)

OTHER PUBLICATIONS

ISA/CN, Translation of Int. Search Report issued on PCT application No. PCT/CN2021/110188, dated Nov. 2, 2021, 3 pages.

(Continued)

*Primary Examiner* — Kenneth J Hansen
(74) *Attorney, Agent, or Firm* — Greenberg Traurig, LLP (57) ABSTRACT

A blower includes a motor, a fan driven by the motor to rotate about a first axis, a power supply device, and a housing assembly accommodating the motor and including an inner duct and an outer duct assembly. The inner duct is formed with an inner air inlet. The outer duct assembly surrounds the inner duct. The outer duct assembly includes an outer duct and a hood, where the outer duct is disposed on a front side of the hood, an outer air outlet is formed at an end of the outer duct facing away from the hood, an outer air inlet is formed on the hood and has a front end portion and a rear end portion along a direction of the first axis, and the inner air inlet is disposed between the front end portion and the rear end portion along the direction of the first axis.

15 Claims, 7 Drawing Sheets

(51) Int. Cl.
F04D 25/06 (2006.01)
F04D 29/54 (2006.01)

(56) References Cited

U.S. PATENT DOCUMENTS

2020/0214229 A1* 7/2020 Yamaoka .............. F04D 29/403
2022/0408662 A1* 12/2022 Takano .................. F04D 25/06

FOREIGN PATENT DOCUMENTS

| CN | 108420173 A | 8/2018 |
| CN | 109820320 A | 5/2019 |
| CN | 110680069 A | 1/2020 |
| CN | 110680071 A | 1/2020 |
| CN | 210341774 U | 4/2020 |
| CN | 210353624 U | 4/2020 |

OTHER PUBLICATIONS

ISA/CN, International Search Report issued on PCT application No. PCT/CN2021/110188, dated Nov. 2, 2021, 5 pages.
ISA/CN, Written Opinion issued on PCT application No. PCT/CN2021/110188, dated Nov. 2, 2021, 3 pages.
ISA/CN, Translation of the Written Opinion issued on PCT application No. PCT/CN2021/110188, dated Nov. 2, 2021, 3 pages.

* cited by examiner

BLOWER

RELATED APPLICATION INFORMATION

This application is a continuation of International Application Number PCT/CN2021/110188, filed on Aug. 3, 2021, through which this application also claims the benefit under 35 U.S.C. § 119(a) of Chinese Patent Application No. 202010764709.4, filed Aug. 3, 2020, Chinese Patent Application No. 202110836478.8, filed Jul. 23, 2021, and Chinese Patent Application No. 202110836473.5, filed Jul. 23, 2021, the disclosures of which are incorporated herein by reference in their entireties.

BACKGROUND

As a garden tool, a blower may be used for cleaning the ground. The air intake performance of an air intake portion of the blower limits the blowing efficiency of the blower. When the air intake performance is to be improved, the use safety of the blower and the strength of the whole machine need to be considered and the weight of the whole machine had better not to be increased.

SUMMARY

An example provides a blower. The blower includes a motor, a fan, a power supply device, and a housing assembly. The fan is driven by the motor to rotate about a first axis. The power supply device is used for supplying power to the motor. The housing assembly accommodates the motor and includes an inner duct and an outer duct assembly. The inner duct is formed with an inner air inlet. The outer duct assembly surrounds the inner duct. The outer duct assembly includes an outer duct and a hood, where the outer duct is disposed on a front side of the hood, an outer air outlet is formed at an end of the outer duct facing away from the hood, an outer air inlet is formed on the hood and has a front end portion and a rear end portion along a direction of the first axis, and the inner air inlet is disposed between the front end portion and the rear end portion along the direction of the first axis.

In some examples, a distance between the front end portion of the outer air inlet and the inner air inlet along the direction of the first axis is greater than or equal to 3 mm.

In some examples, a distance between the front end portion of the outer air inlet and the inner air inlet along the direction of the first axis is greater than or equal to 40 mm and less than or equal to 100 mm.

In some examples, a ratio of an effective air intake area of the outer air inlet to a cross-sectional area of the inner air inlet perpendicular to the first axis is greater than or equal to 1.8.

In some examples, the hood includes multiple ribs arranged in sequence in a circumferential direction around the first axis, and the outer air inlet is formed between two adjacent ribs of the multiple ribs.

In some examples, a spacing between two adjacent ribs of the multiple ribs is configured to be greater than or equal to 8 mm and less than or equal to 10 mm.

In some examples, one part of the hood is disposed on a front side of the inner air inlet and the other part of the hood is disposed on a rear side of the inner air inlet so that an airflow entering from the hood is capable of flowing to the inner air inlet from the front side and the rear side of the inner air inlet.

In some examples, a total area of the outer air inlet is greater than 20000 mm$^2$.

In some examples, the hood includes first ribs, an annular portion, second ribs, and a central portion arranged in sequence from front to rear, where the annular portion connects the first ribs to the second ribs, the second ribs connect the annular portion to the central portion, and a distance between each of the second ribs and the first axis along a connection path between the annular portion and the central portion gradually decreases.

In some examples, a dimension of the outer air inlet along the direction of the first axis is greater than or equal to 100 mm and less than or equal to 300 mm.

In some examples, the fan includes fan blades, where a number of the fan blades is set to 9.

In some examples, the fan includes fan blades, where a number of the fan blades is configured to be greater than or equal to 8 and less than or equal to 12, and an outer diameter of the fan blades is configured to be greater than 78 mm and less than 130 mm.

In some examples, the outer diameter of the fan blades is configured to be greater than 78 mm and less than 98 mm.

In some examples, an inlet angle of each of the fan blades is configured to be greater than or equal to 5° and less than or equal to 20°.

In some examples, a ratio of the outer diameter of the fan blades to a diameter of a hub of the fan is greater than or equal to 0.41 and less than or equal to 0.5.

DETAILED DESCRIPTION

Figure 1:
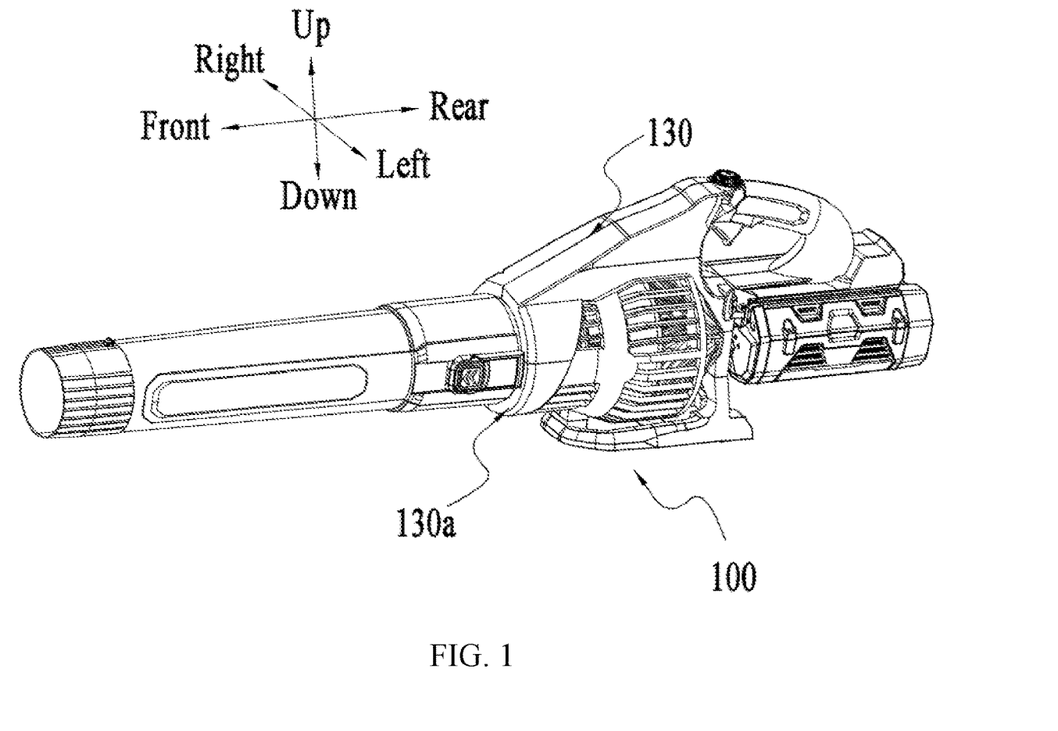
FIG. 1 is a perspective view of a blower according to an example.
Figure 2:
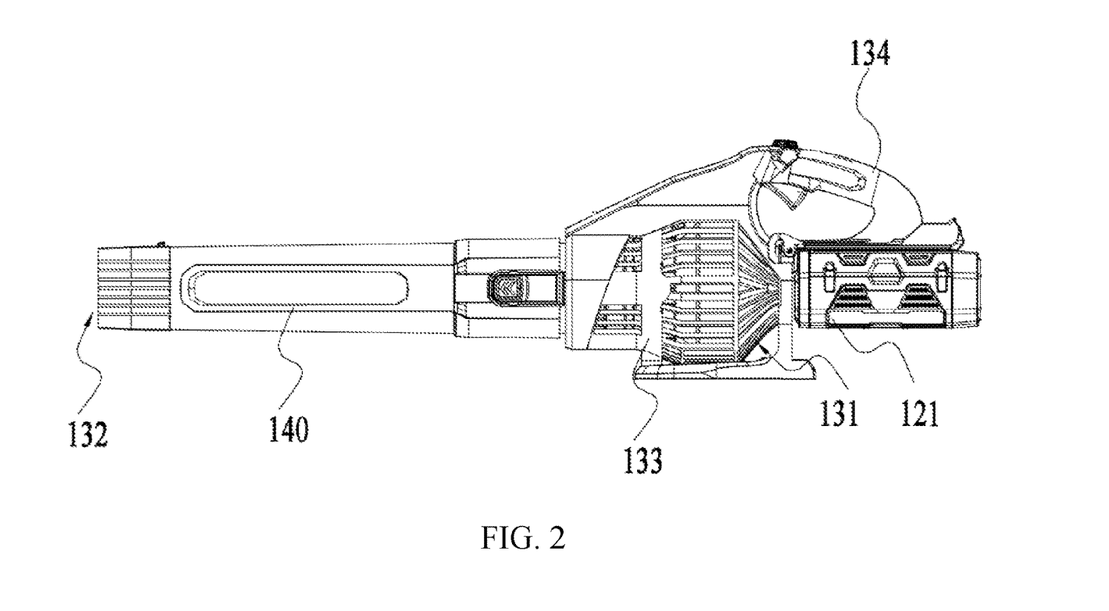
FIG. 2 is a plan view of the blower in FIG. 1.
Figure 3:
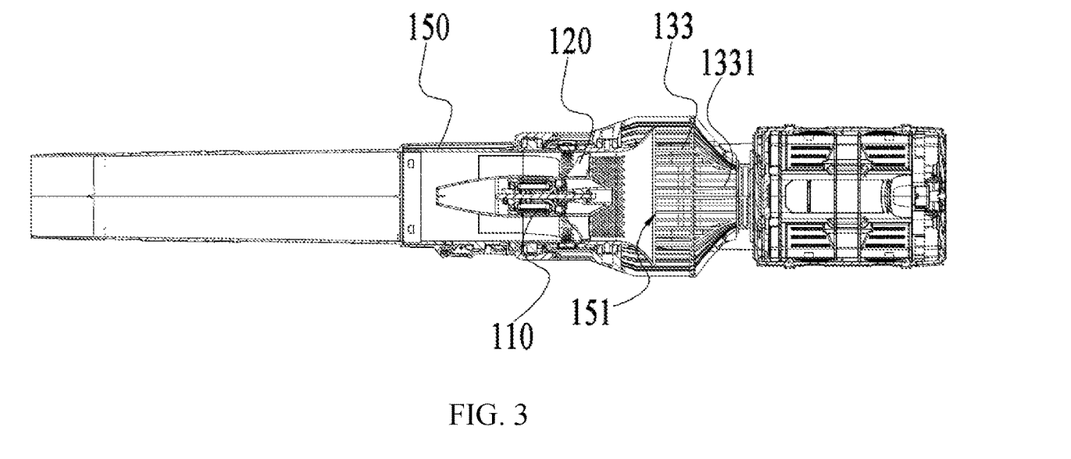
FIG. 3 is a sectional view of the blower in FIG. 1.
Figure 4:
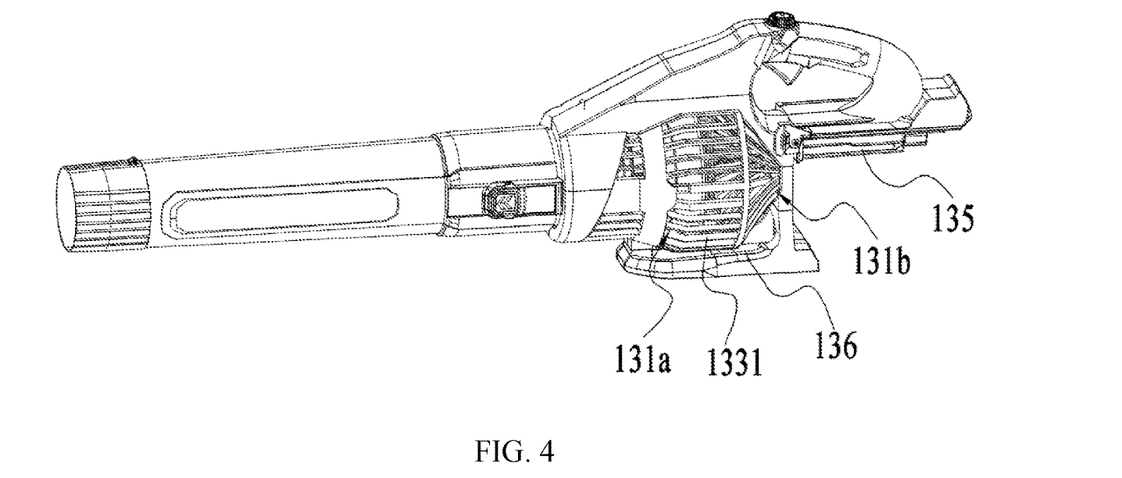
FIG. 4 is a perspective view of the blower in FIG. 1 with a battery pack removed.

In an example of the present application, referring to FIGS. 1 to 3, a blower 100 includes a motor 110, a fan 120, a power supply device 121, and a housing assembly 130. The housing assembly 130 includes an outer duct assembly 130a and an inner duct 150, where the outer duct assembly 130a includes an outer duct 140 and a hood 133. The fan 120 is driven by the motor 110 to rotate, and the power supply device 121 is used for supplying power to the motor 110. The outer duct assembly 130a provides an outer air inlet 131 and an outer air outlet 132. The inner duct 150 is used for supporting the motor 110 and formed with an inner air inlet 151. The outer duct assembly 130a surrounds the inner duct 150. The outer duct 140 is disposed on a front side of the hood 133. One part of the inner duct 150 is disposed in the outer duct 140, and the other part of the inner duct 150 is disposed in the hood 133. The outer duct 140 provides the outer air outlet 132, and the hood 133 provides the outer air inlet 131. The hood 133 provides the outer air inlet 131, and the hood 133 surrounds an end of the inner duct 150 so that part of an airflow entering from the hood 133 can flow from a rear end portion of the inner duct 150 to the inner air inlet 151.

Optionally, it is set that the motor 110 rotates about a first axis 101, and the outer air inlet 131 has a front end portion 131a and a rear end portion 131b along a direction of the first axis 101. The inner air inlet 151 is disposed between the front end portion 131a and the rear end portion 131b along the direction of the first axis 101. In this manner, the airflow can enter the hood 133 from a front side and a rear side of the inner air inlet 151 separately and then enter the inner air inlet 151.

The hood 133 surrounds the inner air inlet 151. In a front and rear direction, one part of the hood 133 is disposed on the front side of the inner air inlet 151, and the other part of the hood 133 is disposed on the rear side of the inner air inlet 151. In an up and down direction, one part of the hood 133 is disposed on an upper side of the inner air inlet 151, and the other part of the hood 133 is disposed on a lower side of the inner air inlet 151. In a left and right direction, one part of the hood 133 is disposed on a left side of the inner air inlet 151, and the other part of the hood 133 is disposed on a right side of the inner air inlet 151. That is to say, the hood 133 is distributed on the front side, the rear side, the upper side, the lower side, the left side, and the right side of the inner air inlet 151.

The outer air inlet 131 is formed on the hood 133 and surrounds the inner air inlet 151. In the front and rear direction, one part of the outer air inlet 131 is disposed on the front side of the inner air inlet 151, and the other part of the outer air inlet 131 is disposed on the rear side of the inner air inlet 151. In the up and down direction, one part of the outer air inlet 131 is disposed on the upper side of the inner air inlet 151, and the other part of the outer air inlet 131 is disposed on the lower side of the inner air inlet 151. In the left and right direction, one part of the outer air inlet 131 is disposed on the left side of the inner air inlet 151, and the other part of the outer air inlet 131 is disposed on the right side of the inner air inlet 151. That is to say, the outer air inlet 131 is distributed on the front side, the rear side, the upper side, the lower side, the left side, and the right side of the inner air inlet 151. Therefore, an air intake area of the outer air inlet 131 is increased, air can enter the blower 100 in multiple directions, air intake efficiency is improved, and wind resistance is reduced. The hood 133 includes multiple ribs 1331 arranged in sequence in a circumferential direction around the first axis. The outer air inlet 131 is formed between two adjacent ribs 1331. A spacing between adjacent ribs 1331 is configured to be greater than or equal to 8 mm and less than or equal to 10 mm, thereby increasing an effective air intake area and the air intake efficiency. In this example, a total area of the outer air inlet 131 is greater than 20000 mm².

Referring to FIGS. 1 to 4, the outer duct assembly 130a further includes a handle portion 134 connected to the front end portion 131a of the outer air inlet 131, where the handle portion 134 may be in contact with an upper side of the outer air inlet 131. The handle portion 134 may also be spaced apart from the outer air inlet 131, thereby increasing the air intake area. The housing assembly 130 further includes an electrical connection portion 135 detachably connected to the power supply device, where the power supply device may be a battery pack. The housing assembly 130 further includes a bracket 136 disposed on a lower side of the outer air inlet 131, where the bracket 136 is formed with a support plane. When the battery pack is not mounted to the electrical connection portion 135, a projection of a center of gravity of the entire blower 100 on a plane where the support plane is located is located within the support plane so that the blower 100 can be stably placed on the plane through the bracket 136. The projection of the center of gravity of the entire blower 100 on the plane where the support plane is located is located within a projection of the outer air inlet 131 on the plane.

Figure 5:
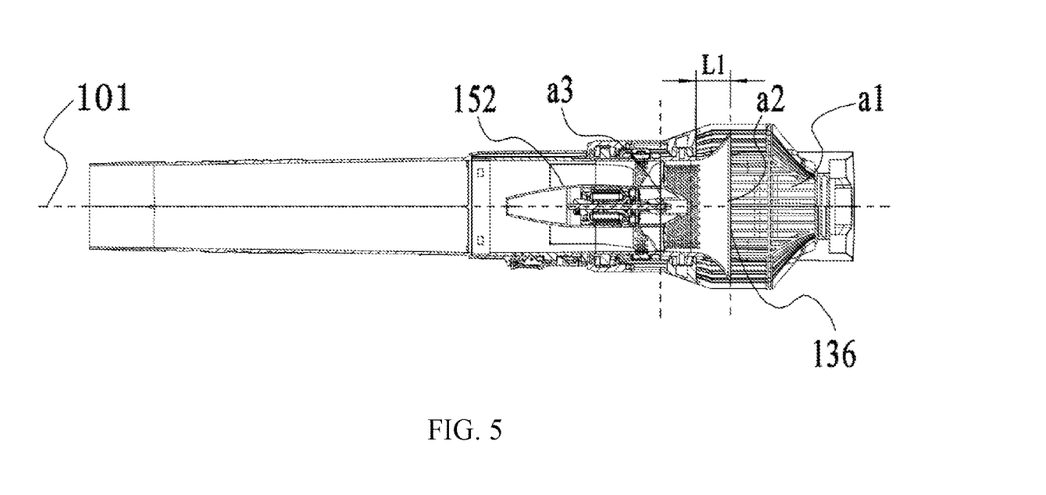
FIG. 5 is a sectional view of the blower in FIG. 1 with a battery pack removed.

Referring to FIG. 5, a ratio of an effective air intake area a1 of the outer air inlet 131 to a cross-sectional area a2 of the inner air inlet 151 perpendicular to the first axis 101 is greater than or equal to 1.8. A ratio of the effective air intake area a1 of the outer air inlet 131 to a cross-sectional area a3 of the inner duct 150 in a plane passing through the fan 120 and perpendicular to the first axis 101 is greater than or equal to 2 and less than or equal to 5, thereby increasing an intake air volume and the air intake efficiency of the blower 100. The ratio of the effective air intake area a1 of the outer air inlet 131 to the cross-sectional area a3 of the inner duct 150 in the plane passing through the fan 120 and perpendicular to the first axis 101 is greater than or equal to 3 or less than or equal to 4.5, and a distance between the outer air inlet 131 and the inner air inlet 151 is relatively increased, thereby reducing a wind speed at the outer air inlet 131, reducing the wind resistance, and improving the air intake efficiency.

A distance L1 between the front end portion 131a of the outer air inlet 131 and the inner air inlet 151 in an axial direction of the first axis 101 is greater than or equal to 3 mm, thereby reducing noise generated during operation of the blower 100. Optionally, to improve the air intake efficiency, the distance L1 between the front end portion 131a of the outer air inlet 131 and the inner air inlet 151 in the axial direction of the first axis is greater than or equal to 40 mm and less than or equal to 100 mm.

Figure 6:
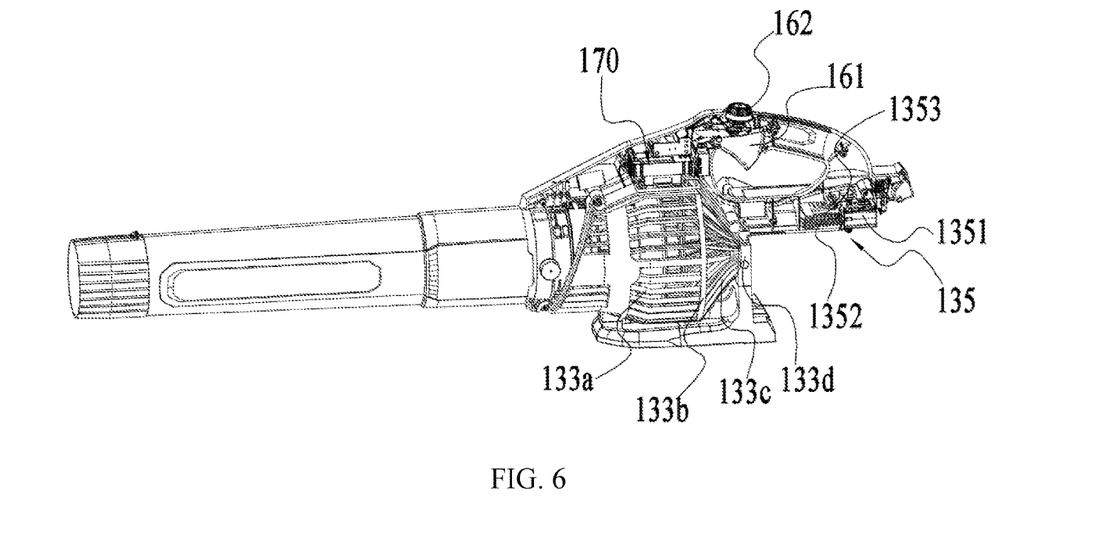
FIG. 6 is a schematic view illustrating an internal structure of the blower in FIG. 1.

For example, as shown in FIG. 6, the hood 133 includes first ribs 133a, an annular portion 133b, second ribs 133c, and a central portion 133d arranged in sequence from front to rear, where the annular portion 133b connects the first ribs 133a to the second ribs 133c. The annular portion 133b is disposed around the first axis 101, the second ribs 133c and the central portion 133d are disposed on the rear side of the inner air inlet 151, and the central portion 133d is disposed on the first axis 101. The second ribs 133c connect the annular portion 133b to the central portion 133d, and a distance between each of the second ribs 133c and the first axis 101 along a connection path between the annular portion 133b and the central portion 133d gradually decreases. That is to say, the second ribs 133a gradually converge from the annular portion 133b to the central portion 133d.

Figure 7:
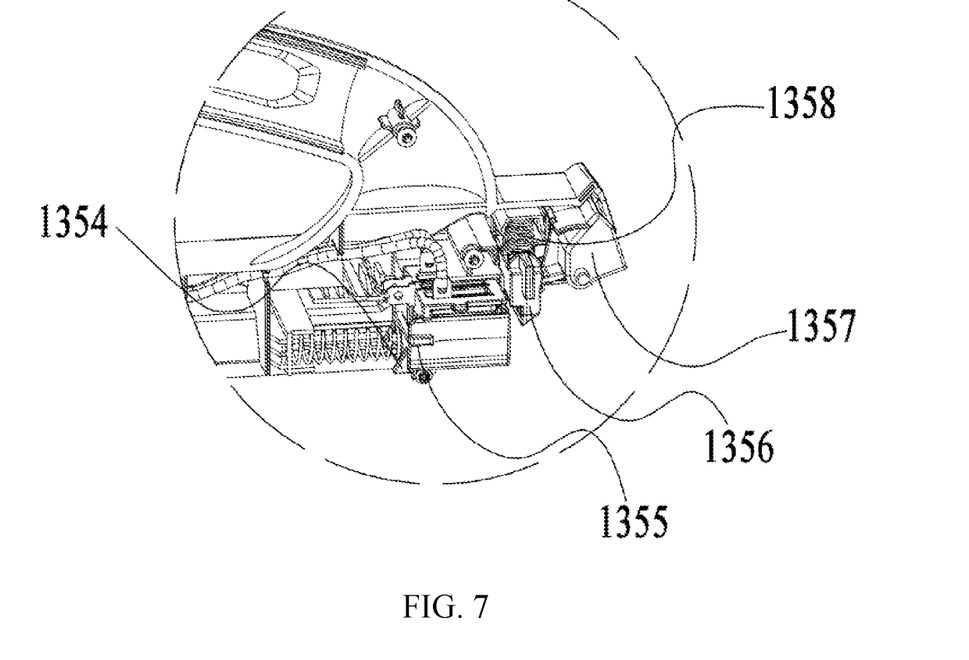
FIG. 7 is an enlarged view of part of the structure of the blower in FIG. 6.

Referring to FIGS. 6 and 7, the electrical connection portion 135 includes a slider 1351, an elastic element 1352, and a positioning groove 1353. The slider 1351 has a first positioning member 1354 and a second positioning member 1355. The elastic element 1352 abuts against the slider 1351. The slider 1351 is disposed in the positioning groove 1353, and the first positioning member 1354 and the second positioning member 1355 are configured to abut against the positioning groove 1353 such that the slider 1351 can slide in the positioning groove 1353. The electrical connection portion 135 includes a connection end and a pole piece disposed at the connection end. When the battery pack is connected to the electrical connection portion 135, the battery pack abuts against the connection end and is in contact with the pole piece. The slider 1351 is partially exposed at the connection end. When the battery pack is not mounted, the slider 1351 surrounds the pole piece so that a user cannot be in direct contact with the pole piece, thereby preventing the user from being in contact with the pole piece and thus from an electric shock. The elastic element 1352 is connected to and abuts against the slider 1351. When the user inserts the battery pack, the slider 1351 slides from an outer side of the connection end to an inside of the positioning groove 1353, the first positioning member 1354 and the second positioning member 1355 support the sliding of the slider 1351 inside the positioning groove 1353, and the slider 1351 is displaced so that the pole piece is exposed, and the battery pack is electrically connected to the pole piece.

The first positioning member 1354 and the second positioning member 1355 are spaced apart from each other in a height direction so that the positioning groove 1353 may have a certain height, thereby preventing dust from clogging the positioning groove 1353 and reducing the risk of the slider 1351 being jammed due to dust. The first positioning member 1354 and the second positioning member 1355 are provided, thereby reducing the waggles of the slider 1351 in the positioning groove 1353.

The electrical connection portion 135 further includes a lock 1356 and a release button 1357. When the battery pack is connected to the electrical connection portion 135, the lock 1356 abuts against the front end portion of the slider 1351, thereby restraining the elastic element 1352 from driving the slider 1351 to move forwards, that is, preventing the slider 1351 from moving to an outside of the positioning groove 1353. A second elastic member 1358 is connected to the lock 1356. When the user toggles the release button 1357 to compress the second elastic member 1358, the lock 1356 is driven to be displaced, the movement of the slider 1351 is no longer limited, and the elastic element pushes the slider 1351 to drive the battery pack to be pulled out from the electrical connection portion 135.

In a working process of the blower 100, the fan 120 rotates at a high speed and tends to generate static electricity. Not only does the static electricity easily break down electronic elements of the blower 100, causing damage to the blower 100, but also the static electricity easily causes an electrical spark to strike the user. To reduce the static electricity generated by the fan 120, the number of fan blades needs to be reduced. However, if the number of fan blades is directly reduced, the volume of air generated by the fan 120 is insufficient, reducing the performance of the blower 100. Optionally, referring to FIGS. 8, 9, and 10, the fan 120 includes fan blades 122, where an outer diameter L2 of the fan blades 122 is configured to be greater than 78 mm and less than 130 mm and a minimum distance between two fan blades 122 is configured to be greater than or equal to 8 mm and less than or equal to 12 mm. If the distance between fan blades 122 is too short, the static electricity generated during the rotation of the fan is increased due to friction of the airflow against the fan blades; and if the distance between the fan blades 122 is too long, the volume of air generated by the fan is reduced. An inlet angle a1 of each of the fan blades is configured to be greater than or equal to 5° and less than or equal to 20°. The inlet angle of the fan blade 122 refers to an included angle between a tangent line of a front section of a root 122*a* of the fan blade 122 and an axis of the fan 120 (where the front section of the root 122*a* of the fan blade 122 refers to a part of the root 122*a* of the fan blade 122 which cuts air relatively first).

Figure 8:
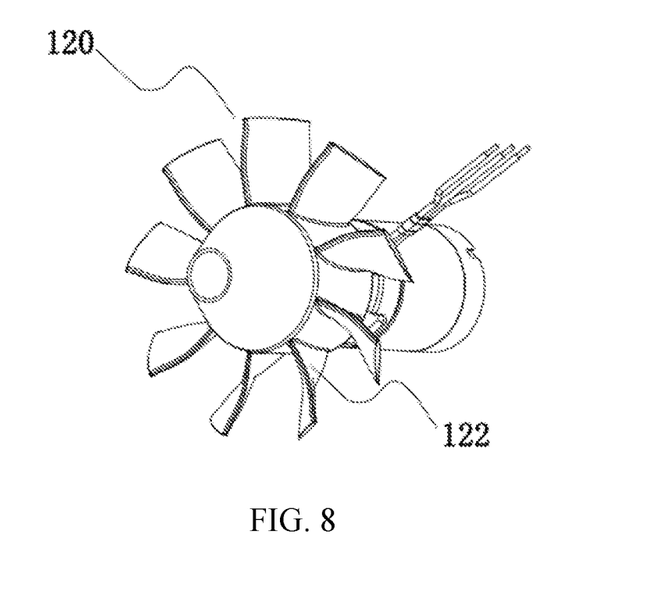
FIG. 8 is a perspective view of a fan and a motor of the blower in FIG. 1.
Figure 9:
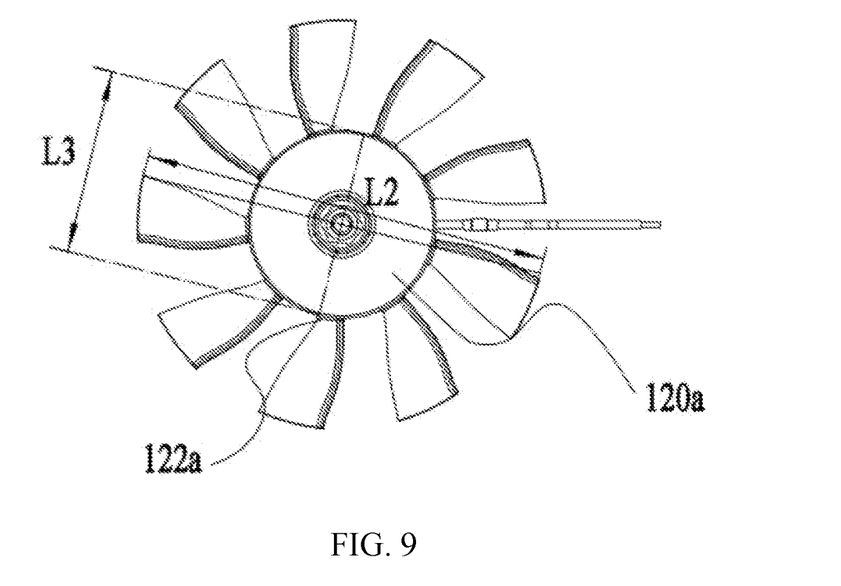
FIG. 9 is a plan view of the structure shown in FIG. 8.
Figure 10:
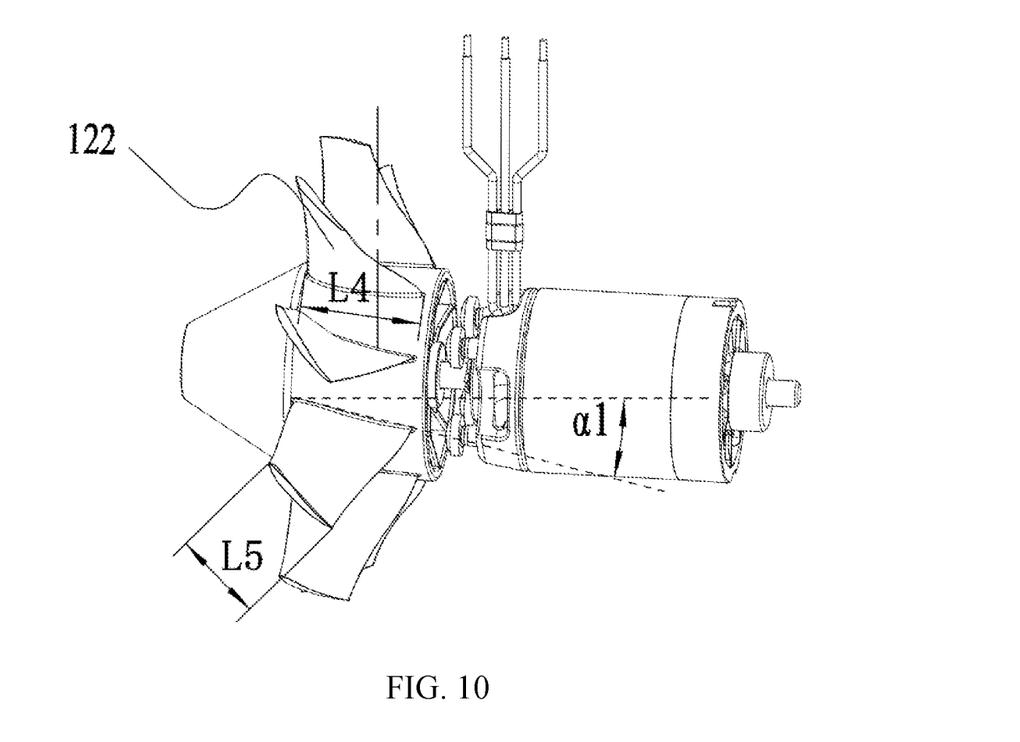
FIG. 10 is a perspective view of the structure shown in FIG. 8 from another angle.

The number of the fan blades 122 is configured to be greater than or equal to 8 and less than or equal to 12. A twist angle a2 of the fan blade 122 is configured to be greater than or equal to 45° and less than or equal to 54°. It is found that if the twist angle of the fan blade 122 is too large, a wind force generated in the axial direction is relatively small, and if the twist angle of the fan blade 122 is too small, the airflow is dispersed in a radial direction of the fan blade 122 so that it is necessary to set an appropriate twist angle of the fan blade 122 so as to increase the air output of the fan. A diameter L3 of a hub 120*a* of the fan 120 is configured to be greater than or equal to 35 mm and less than or equal to 45 mm, and a length L4 of the root 122*a* of the fan blade 122 is configured to be greater than or equal to 18 mm and less than or equal to 29 mm. A length L5 of an edge of the fan blade 122 is configured to be greater than or equal to 8.5 mm and less than or equal to 14.5 mm. Compared with the conventional fan 120, the fan 120 provided in this example can reduce an air cutting frequency at the same rotational speed and reduce the noise generated by the rotation of the fan 120. A hub diameter ratio is configured to be greater than or equal to 0.41 and less than or equal to 0.5, the inlet angle of the fan blade 122 is reduced, and a chord length of the root 122*a* of the fan blade 122 is increased so that kinetic energy efficiency of the fan 120 can be effectively improved. In this manner, the fan 120 can generate an increased volume of air under the same power. The hub diameter ratio is a ratio of the outer diameter L2 of the fan blades 122 to the diameter L3 of the hub 120*a*. Optionally, the outer diameter L2 of the fan blades 122 is configured to be greater than 78 mm and less than 98 mm so that the kinetic energy efficiency can be better improved.

The outer diameter of the fan blades 122 is configured to be greater than 82 mm and less than 94 mm. On an axial projection of the fan 120 on a shaft center of the fan 120, an included angle between a line connecting one of adjacent end points of two adjacent fan blades 122 and the shaft center and a line connecting the other one of the adjacent end points of the two adjacent fan blades 122 and the shaft center is configured to be greater than or equal to 10 degrees and less than or equal to 20 degrees. Optionally, the included angle between the line connecting one of the adjacent end points of the two adjacent fan blades 122 and the shaft center and the line connecting the other one of the adjacent end points of the two adjacent fan blades 122 and the shaft center is configured to be greater than or equal to 12 degrees and less than or equal to 18 degrees. The inlet angle a1 of the fan blade 122 is configured to be greater than or equal to 5° and less than or equal to 15°. The number of the fan blades 122 is configured to be greater than or equal to 8 and less than or equal to 9. For example, in an example, the number of the fan blades 122 is set to 9. The diameter L3 of the hub 120*a* of the fan 120 is configured to be greater than or equal to 38 mm and less than or equal to 42 mm, and the length L4 of the root 122*a* of the fan blade 122 is configured to be greater than or equal to 20 mm and less than or equal to 26 mm. The length L5 of the edge of the fan blade is configured to be greater than or equal to 10 mm and less than or equal to 13 mm. Compared with the conventional fan 120, the fan 120 provided in this example can reduce the air cutting frequency at the same rotational speed and reduce the noise generated by the rotation of the fan 120. Optionally, the hub diameter ratio (the ratio of the outer diameter of the fan blades 122 to the diameter of the hub 120*a*) is relatively increased to be greater than or equal to 0.43 and less than or equal to 0.49, the inlet angle of the fan blade is reduced, and the chord length of the root 122*a* of the fan blade 122 is increased so that the kinetic energy efficiency of the fan 120 can be effectively improved. In this manner, the fan 120 can generate an increased volume of air under the same power.

Figure 11:
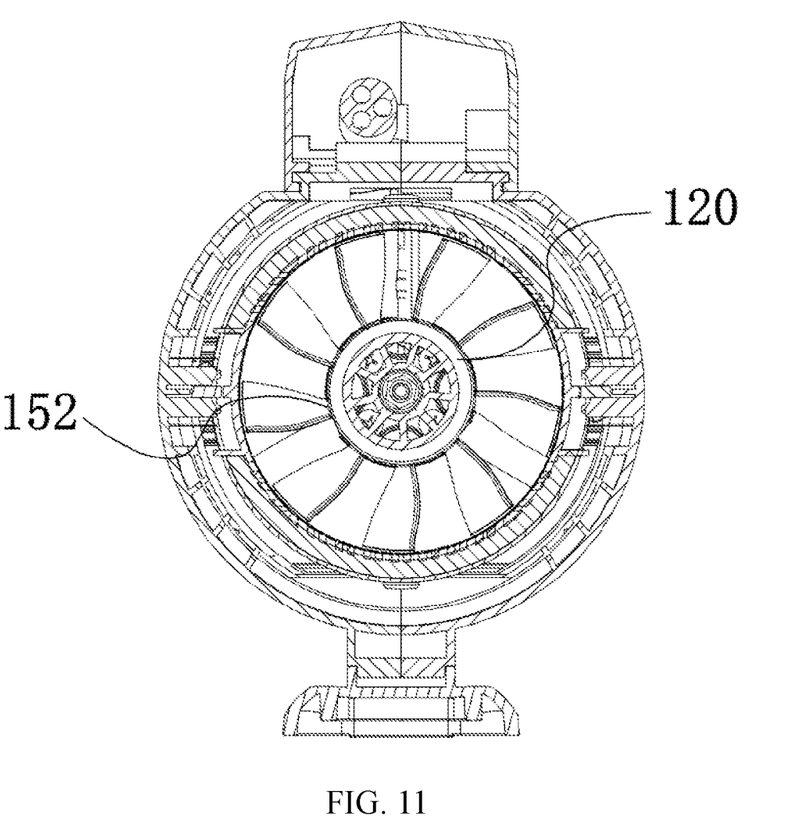
FIG. 11 is another sectional view of the blower in FIG. 1.

Referring to FIG. 11, a flow guide cone 152 that fixes the motor 110 is formed inside the inner duct 150, the motor 110 is disposed in the flow guide cone 152, and the diameter of the hub of the fan 120 and a diameter of an end surface of the flow guide cone 152 are consistent or differ by no more than 10% of the diameter of the hub of the fan 120 in the axial direction of the first axis 101 so that a projection of the hub of the fan 120 and a projection of the flow guide cone 152 basically overlap in the axial direction of the first axis 101, and no gap exists between the hub of the fan 120 and the flow guide cone 152 in a radial direction of the first axis 101.

When the motor 110 operates, the fan 120 rotates to generate a high-speed airflow, the air pressure near the fan 120 is relatively low, and a heat dissipation airflow flows from the front end portion of the flow guide cone 152 to the rear end portion of the flow guide cone 152, that is, flows to near the fan 120. The hub of the fan 120 and the flow guide cone 152 are similar in dimension so that the gap between the hub of the fan 120 and the flow guide cone 152 is reduced, a smaller volume of air of the airflow generated by the rotation of the fan 120 flows to the inside of the flow guide cone 152, and an airflow inside the flow guide cone 152 is prevented from being disturbed, thereby effectively improving heat dissipation efficiency of the motor 110.

Figure 12:
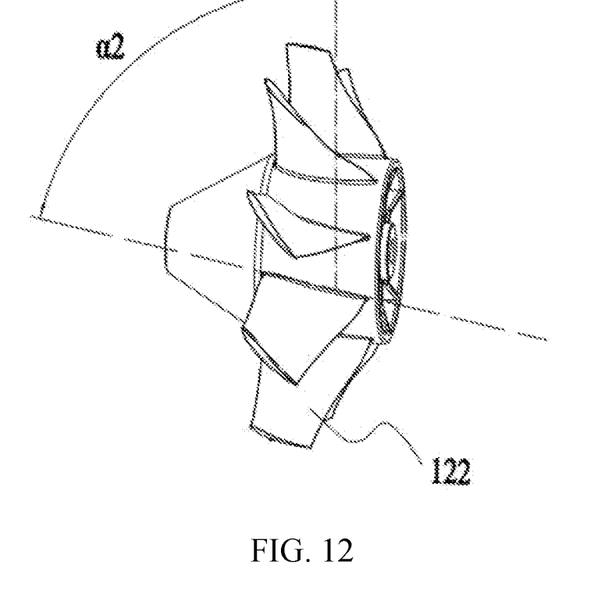
FIG. 12 is a perspective view of the fan in FIG. 8.

Referring to FIGS. 6 and 12, the blower 100 further includes a control unit 170 and an operating assembly 160. The fan 120 is driven by the motor 110 to rotate, the power supply device 121 is used for supplying power to the motor 110, the control unit 170 controls the operation of the motor 110, and the operating assembly 160 is communicatively connected to the control unit 170. The operating assembly 160 includes a trigger 161 for the user to control the start and rotational speed of the motor 110. The operating assembly 160 further includes a speed regulation knob 162 configured to be operable so as to perform a first action and a second action. When the speed regulation knob 162 is operated so as to perform the first action, the speed regulation knob 162 sends an electrical signal to the operating assembly 160 so as to adjust and lock the rotational speed of the motor 110. When the second action is performed on the speed regulation knob 162, the speed regulation knob 162 sends an electrical signal to the operating assembly 160 to lock the fan 120 for rotation in a maximum gear. The blower 100 further includes a control circuit through which the power supply device 121, the control unit 170, and the operating assembly 160 are electrically connected.

The first action is to rotate the speed regulation knob 162 along a first direction or a second direction, and the second action is to press the speed regulation knob 162. The inner duct 150 is used for supporting the motor 110. The trigger 161 is disposed on a lower side of the handle portion 134, and the speed regulation knob 162 is disposed on an upper side of the handle portion 134 so that when holding the handle portion 134, the user can touch and control the trigger 161 and the speed regulation knob 162 at the same time, press the trigger 161, and perform the first action and the second action on the speed regulation knob 162. That is, when holding the handle portion 134, the user can press the trigger 161 and press the speed regulation knob 162 at the same time, or press the trigger 161 and rotate the speed regulation knob 162 at the same time, or press the trigger 161 and press and rotate the speed regulation knob 162 at the same time.

Optionally, when the first action is performed on the speed regulation knob 162, the speed regulation knob 162 sends a position signal to the control unit 170 so as to adjust and lock the rotational speed of the motor 110.

The control unit 170 is configured to be an integrated printed circuit board (PCB). When the trigger 161 is pressed by the user to be displaced, a first type of signal is sent to the control unit 170, and the control unit 170 controls the rotational speed of the motor 110 according to information of the first type of signal. Optionally, a resistance value of the control circuit is changed by the displaced trigger 161, so as to send a corresponding voltage signal to the control unit 170, adjust a duty cycle, and thus control the rotational speed of the motor 110. In this case, the first type of signal is the voltage signal. The control unit 170 is configured to control, when receiving only the first type of signal, the motor 110 to be turned on. Optionally, when the voltage signal reaches a preset value, the control unit 170 controls the motor 110 to be turned on. When the trigger 161 is no longer pressed, the control unit 170 controls, according to a change of the first type of signal, the motor 110 to stop rotating.

When the speed regulation knob 162 is operated so as to perform the first action, that is, the speed regulation knob 162 is rotated, a second type of signal is sent to the control unit 170, and the control unit 170 locks a minimum rotational speed of the motor 110 according to the second type of signal. Optionally, the second type of signal is a phase signal. When the speed regulation knob 162 is rotated, a varying phase signal is outputted, and the control unit 170 adjusts the duty cycle of the control circuit according to a change of the phase signal so that a speed regulation process is smoother and more reliable.

After the user locks a minimum rotational speed of the fan 120 through the speed regulation knob 162, when the user presses the trigger 161, the control unit 170 still increases the rotational speed of the fan 120 when receiving the first type of signal; after the user releases the trigger 161, limited by a rotational speed signal outputted by the speed regulation knob 162, the rotational speed of the fan 120 may be reduced to the minimum rotational speed locked through the speed regulation knob 162. When the speed regulation knob 162 is rotated to a certain position, the rotational speed of the fan 120 is not lower than a rotational speed corresponding to the position.

Optionally, the speed regulation knob 162 is configured such that when the speed regulation knob 162 is rotated along the first direction, the control unit 170 increases the locked minimum rotational speed of the motor 110. That is, when the speed regulation knob 162 is rotated by 30 degrees along the first direction, the control unit 170 controls the locked minimum rotational speed of the motor 110 to be a first rotational speed. When the speed regulation knob 162 is rotated by 60 degrees, the control unit 170 controls the locked minimum rotational speed of the motor 110 to be a second rotational speed, where the second rotational speed is greater than the first rotational speed. When the locked minimum rotational speed of the motor 110 is the first rotational speed, the control unit 170 may control, according to the first type of signal outputted by the trigger 161, the motor 110 to rotate at a rotational speed greater than the first rotational speed. When a speed corresponding to a position of the trigger 161 is less than the first rotational speed, the control unit 170 controls the motor 110 to operate at the first rotational speed.

The speed regulation knob 162 has a rotational position corresponding to a locked maximum speed, that is, when the speed regulation knob 162 is rotated in the first direction to or beyond a certain angle, the control unit 170 receives the second type of signal and controls the locked minimum rotational speed of the motor 110 to have the highest value. At this time, when the speed regulation knob 162 at the rotational position continues to be rotated in the first direction, the control unit 170 no longer increases the locked minimum rotational speed of the motor 110. After the speed regulation knob 162 is rotated in the first direction to a certain angle, when the speed regulation knob 162 is operated and rotated in the second direction opposite to the first direction, the second type of signal is sent to the control unit 170, and the control unit 170 controls, according to the second type of signal, the locked minimum rotational speed of the motor 110 to decrease. When the speed regulation knob 162 continues to be rotated in the second direction, the locked minimum rotational speed of the motor 110 may be reduced to zero.

The second type of signal outputted by the speed regulation knob 162 includes a first pulse signal and a second pulse signal, and the control unit 170 determines a rotational direction of the speed regulation knob 162 by identifying a relative position of the first pulse signal and the second pulse signal, thereby identifying a speed-up command or a speed-down command of the user. The control unit 170 identifies a rotational angle of the speed regulation knob 162 by identifying a phase difference between the first pulse signal and the second pulse signal, thereby correspondingly adjusting the locked minimum rotational speed of the motor 110.

A sensing element is disposed below the speed regulation knob 162. When the speed regulation knob 162 is operated so as to perform the second action, that is, the speed regulation knob 162 is pressed, the sensing element senses the action on the speed regulation knob 162 and sends a third type of signal to the control unit 170. When receiving the third type of signal, the control unit 170 controls the motor 110 to operate at a set maximum rotational speed. When the motor 110 operates at the maximum rotational speed, the fan 120 is driven at the maximum rotational speed to rotate, and the control unit 170 locks the fan 120 for rotation in the maximum gear. Optionally, a maximum value of the locked minimum rotational speed of the motor 110 is configured to be less than the maximum rotational speed of the motor 110. That is, when the user operates the speed regulation knob 162 to perform the second action only, the motor 110 can be driven to operate at the maximum rotational speed to which the rotational speed of the motor 110 cannot be regulated by rotating the speed regulation knob 162. When the speed regulation knob 162 is operated so as to perform the second action, the control unit 170 receives the third type of signal and locks the motor 110 to the maximum rotational speed. At this time, the rotation of the motor 110 cannot be stopped even if the trigger 161 is released.

In an example of the present application, the operating assembly 160 includes the trigger 161 and the speed regulation knob 162, where the trigger 161 is configured such that when the trigger 161 is pressed, the control unit 170 controls the motor 110 to start, and a displacement of the trigger 161 pressed is proportional to the rotational speed. When the speed regulation knob 162 is not operated, if the trigger 161 is released, the control unit 170 controls the motor 110 to stop rotating. The specific control principle is similar to that of the preceding examples and is not described in detail here.

The speed regulation knob 162 is configured such that the speed regulation knob 162 is operated so as to lock the rotational speed currently adjusted to through the trigger 161. When the user presses the trigger 161 to cause the motor 110 to output at the first rotational speed, the speed regulation knob 162 is operated to rotate in the first direction by an angle, so as to lock the rotational speed of the motor 110, where the angle may be one or two units of rotation of the speed regulation knob 162. For example, one unit of rotation of the speed regulation knob 162 is 15 degrees by which the speed regulation knob 162 is rotated. When the user presses the trigger 161 to control the motor 110 to output at the first rotational speed and then rotates the speed regulation knob 162 in the first direction by a preset angle, the speed regulation knob 162 generates the second type of signal for the control unit 170, and the control unit 170 controls, according to the second type of signal, the rotational speed of the motor 110 to be maintained at the first rotational speed. After the rotational speed of the motor 110 is locked by rotating the speed regulation knob 162, the trigger 161 is released, and the control unit 170 controls the motor 110 to still rotate at the first rotational speed. After the rotational speed of the motor 110 is locked by rotating the speed regulation knob 162, the speed regulation knob 162 is rotated along the first direction such that the speed regulation knob sends the second type of signal to the control unit 170, and the control unit 170 adjusts the duty cycle to adjust the rotational speed of the motor 110. In this manner, the motor 110 can be adjusted to a preset maximum value of the locked rotational speed. An algorithm is provided in the control unit 170 such that when the rotational speed of the motor 110 reaches the preset maximum value, the rotational speed of the motor 110 is no longer increased even when the speed regulation knob 162 continues to be rotated along the first direction. At this time, when rotated along the second direction, the speed regulation knob 162 generates the second type of signal and sends the second type of signal to the control unit 170, and the control unit 170 controls, according to information of the second type of signal, the motor 110 to correspondingly reduce the speed according to a rotational angle of the speed regulation knob 162 in the second direction until the speed regulation knob 162 continues to be rotated in the second direction. In this manner, the speed of the motor 110 is reduced to zero.

When the speed regulation knob 162 is pressed, the third type of signal is sent to the control unit 170, and the control unit 170 adjusts the motor 110 to increase the rotational speed so that the fan is at the set maximum rotational speed that is greater than the maximum value of the rotational speed that can be locked by rotating the speed regulation knob 162. At this time, the speed regulation knob 162 is rotated in the first direction by at least one unit of rotation such that the speed regulation knob 162 sends the second type of signal to the control unit 170 and the control unit 170 locks the motor 110 at the maximum rotational speed. The control unit 170 is configured to control the motor 110 to be disengaged from a locked state and end the maximum rotational speed of the motor 110 when receiving only the second type of signal generated by the speed regulation knob 162 when rotated in the second direction.

The control unit 170 is disposed in the handle portion 134. The blower 100 further includes a heat sink disposed between the control unit 170 and the outer air inlet 131, where the heat sink is at least partially in contact with the control unit 170, and the heat sink is close to the outer air inlet 131 and at least partially exposed to the outer air inlet 131. The heat sink is used for guiding heat generated by the control unit 170, and heat absorbed by the heat sink is taken away by an airflow generated by an air intake portion, thereby improving a heat dissipation effect on the control unit 170.

What is claimed is:

1. A blower, comprising:
a motor;
a fan driven by the motor to rotate about a first axis;
a power supply device for supplying power to the motor; and
a housing assembly, accommodating the motor, comprising an inner duct formed with an inner air inlet and an outer duct assembly surrounding the inner duct;
wherein the outer duct assembly comprises an outer duct and a hood, the outer duct is disposed on a front side of the hood, an outer air outlet is formed at an end of the outer duct facing away from the hood, an outer air inlet is formed on the hood and has a front end portion and a rear end portion along a direction of the first axis, and the inner air inlet is disposed between the front end portion and the rear end portion along the direction of the first axis.

2. The blower of claim 1, wherein a distance between the front end portion of the outer air inlet and the inner air inlet along the direction of the first axis is greater than or equal to 3 mm.

3. The blower of claim 1, wherein a distance between the front end portion of the outer air inlet and the inner air inlet along the direction of the first axis is greater than or equal to 40 mm and less than or equal to 100 mm.

4. The blower of claim 1, wherein a ratio of an effective air intake area of the outer air inlet to a cross-sectional area of the inner air inlet perpendicular to the first axis is greater than or equal to 1.8.

5. The blower of claim 1, wherein the hood comprises a plurality of ribs arranged in sequence in a circumferential direction around the first axis, and the outer air inlet is formed between two adjacent ribs of the plurality of ribs.

6. The blower of claim 5, wherein a spacing between two adjacent ribs of the plurality of ribs is configured to be greater than or equal to 8 mm and less than or equal to 10 mm.

7. The blower of claim 1, wherein one part of the hood is disposed on a front side of the inner air inlet and another part of the hood is disposed on a rear side of the inner air inlet so that an airflow entering from the hood is capable of flowing to the inner air inlet from the front side and the rear side of the inner air inlet.

8. The blower of claim 7, wherein a total area of the outer air inlet is greater than 20000 $mm^2$.

9. The blower of claim 1, wherein the hood comprises first ribs, an annular portion, second ribs, and a central portion arranged in sequence from front to rear, the annular portion connects the first ribs to the second ribs, the second ribs connect the annular portion to the central portion, and a distance between each of the second ribs and the first axis along a connection path between the annular portion and the central portion gradually decreases.

10. The blower of claim 1, wherein a dimension of the outer air inlet along the direction of the first axis is greater than or equal to 100 mm and less than or equal to 300 mm.

11. The blower of claim 1, wherein the fan comprises fan blades and a number of the fan blades is set to 9.

12. The blower of claim 1, wherein the fan comprises fan blades, a number of the fan blades is configured to be greater than or equal to 8 and less than or equal to 12, and an outer diameter of the fan blades is configured to be greater than 78 mm and less than 130 mm.

13. The blower of claim 12, wherein the outer diameter of the fan blades is configured to be greater than 78 mm and less than 98 mm.

14. The blower of claim 12, wherein an inlet angle of each of the fan blades is configured to be greater than or equal to 5° and less than or equal to 20°.

15. The blower of claim 12, wherein a ratio of the outer diameter of the fan blades to a diameter of a hub of the fan is greater than or equal to 0.41 and less than or equal to 0.5.

* * * * *